United States Patent Office 3,291,783
Patented Dec. 13, 1966

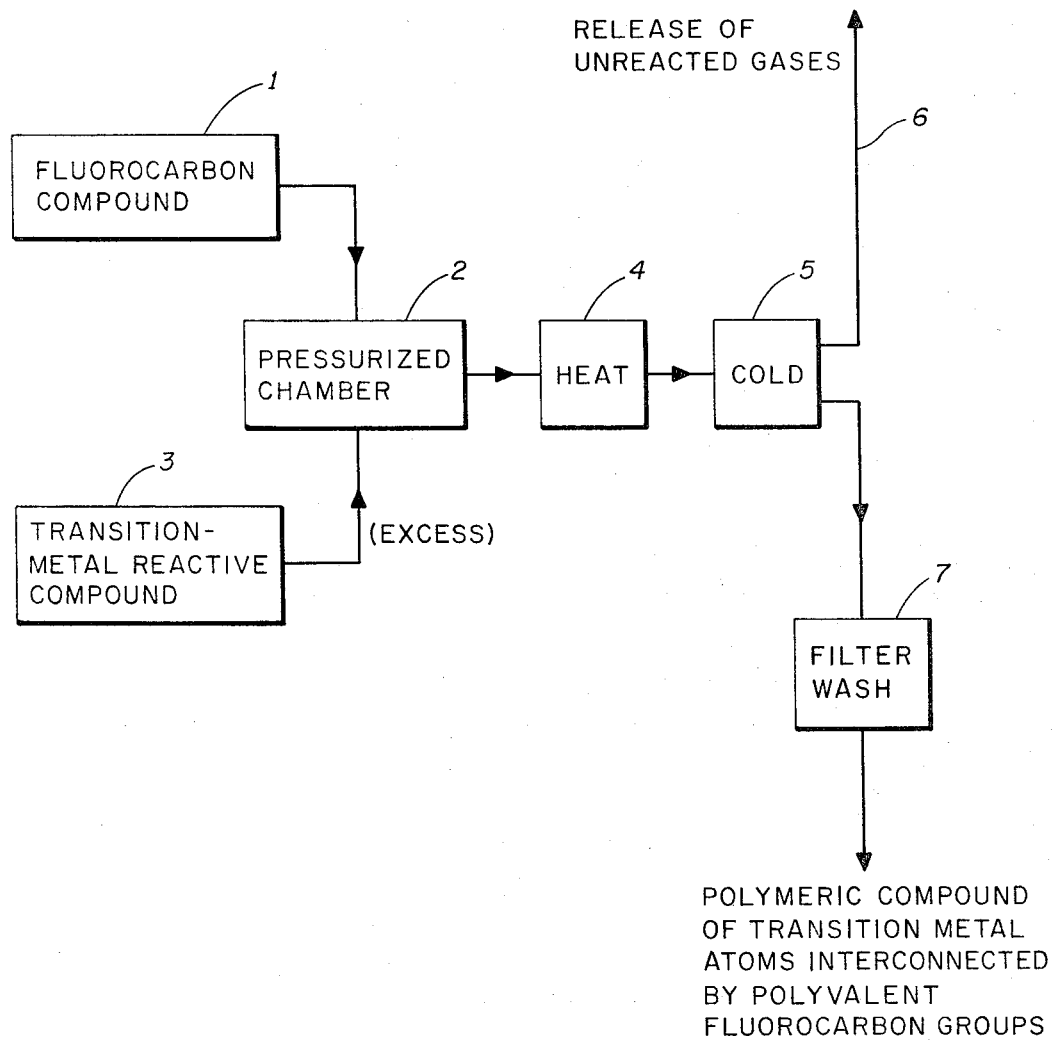

3,291,783
METHOD OF SYNTHESIZING POLYMERS, AND ORGANOMETALLIC POLYMERS
Eugene G. Rochow, Winchester, and Robert L. Stern, Lexington, Mass., assignors to Prototech Incorporated, Cambridge, Mass., a corporation of Massachusetts
Filed July 31, 1962, Ser. No. 213,730
1 Claim. (Cl. 260—92.1)

The present invention relates to polymeric compounds and, more particularly, to methods of synthesizing organo-metallic polymers of novel properties, and to such novel polymers themselves.

Polymeric compounds have heretofore been of several primary types: hydrocarbon polymers, such as polyethylene, consisting of carbon and hydrogen; organic polymers, consisting of a network of carbon atoms bearing substituents, such as chlorine atoms, nitrile groups, hydroxyl groups, or other groupings containing oxygen, sulfur, nitrogen, and the like; and silicones, consisting of a framework of alternate silicon and oxygen atoms with monovalent organic groups attached to the silicon atoms. In such previously known types of polymers, it has not been possible to use transition metal atoms, later-defined, as components of the polymer structure, because such transition metals do not form chemical linkages with the carbon atoms of ordinary organic groups, such as the customary alkyl and aryl groups. It is, in certain instances, advantageous, however, to have the transition metals present within the molecular structure of a polymer in order to confer upon the polymer unusual properties, such as high density, thermal stability, magnetic properties, and the property of being fire retardant or non-combustible. By the term "transition metal," as used in the specification and claims, is meant those elements which lie between calcium and gallium, between strontium and indium, and between barium and thallium in the long-form periodic table of the elements, as given, for example, in General Chemistry by the present applicant, E. G. Rochow, and M. K. Wilson, John Wiley and Sons, New York, 1954, page 62; namely, scandium, titanium, vanadium, chromium, manganese, iron, cobalt, nickel, copper, zinc, yttrium, zirconium, colmubium, molybdenum, technetium, ruthenium, rhodium, palladium, silver, cadmium, lanthanum, hafnium, tantalum, tungsten, rhenium, osmium, iridium, platinum, gold, mercury, and actinium, plus the so-called "inner transition metals" constituted of the rare earth and uranium or actinide metals. Some of the more common and more important of the transition metals are iron, nickel, rhenium, cobalt, chromium, and manganese, which are preferred by reason of their relative abundance and low cost; but any of the other twenty five transition metals above referenced may be employed in accordance with the teachings of the invention.

An object of the invention, accordingly, is to provide a new and improved polymeric composition of matter; specifically, a novel polymer related to polymers of the "Teflon" type, but comprising a plurality of transition metal atoms interconnected by polyvalent fluorocarbon groups. By the term "polyvalent" is meant a group offering at least two chemical linkages that may be connected to different atoms of the before-mentioned transition metals. By the term "fluorocarbon group" is meant the customary alkyl and aryl groups which have most or all of their normal complement of hydrogen atoms substituted by fluorine atoms. If all of the hydrogen atoms of an alkyl group are substituted by fluorine, the result is a perfluoroalkyl group, such as $CF_3$— (perfluoromethyl group). If all of the hydrogen atoms of an aryl group are substituted by fluorine, the result is a perfluoroaryl group, such as $C_6F_5$— (perflourophenyl group).

For the purposes of the present invention, however, the fluorocarbon groups must be at least bivalent, as in the groups —$CF_2$— (perfluoromethylene group)

—$C_4F_8$—

(perfluorobutyl group), and in —$C_6F_4$— (perfluorophenylene group), in order that they may interconnect a plurality of atoms of the constituent transition metal. Alternatively, the fluorocarbon groups may be trivalent (that is, provide three linkages for chemical attachment), or even polyvalent to the extent of providing more than three such chemical linkages.

Another object of the invention is to provide a novel polymer of the "Teflon" type, consisting of a framework of interconnected carbon atoms bearing fluorine atoms, with a plurality of transition metal atoms interconnected by such polyvalent fluorocarbon groups. The invention, however, is not limited to the case of the fluorine replacement of all of the hydrogen atoms associated with the carbon atoms, though in the last example, substantially all of the hydrogen has been replaced by fluorine.

Still another object is to provide a novel method of preparing organo-metallic polymers and the like.

Other and further objects will be explained hereinafter and will more particularly be pointed out in the appended claim.

Reference may also be made to the accompanying drawing, the single figure of which illustrates a flow diagram of a preferred method of preparing the novel polymers of the invention.

Specifically, the class of new polymeric compositions of matter underlying the invention involve the interconnecting of a plurality of transition metal atoms by polyvalent fluorocarbon groups. The metal atoms themselves will generally carry chemically bonded negative groups, such as carbonyl groups, halogen atoms (such as iodine), cyclopentadienyl groups, monovalent fluorocarbons, or the like. These negative groups may be generically indicated by the symbol $R_n$, and serve the purpose of stabilizing the chemical linkage of the transition metal atoms with the interconnecting polyvalent fluorocarbon groups.

The transition metals, before identified, may be represented by the generic symbol M; and the polyvalent fluorocarbon groups, by the symbol $R_F$. The generic formula for a polymer constructed in accordance with the present invention would therefore be:

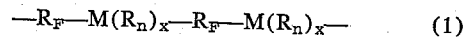
$$—R_F—M(R_n)_x—R_F—M(R_n)_x— \qquad (1)$$

where x is equal to or greater than one, as required by the chemical bonding properties by the transition metal employed.

*Example I*

The following novel polymer of the above-described character was successfully prepared and found to possess thermal stability and magnetic properties not encountered in the customary organic polymers, being of the general type of Formula 1 above:

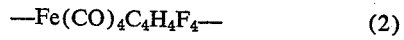
$$—Fe(CO)_4C_4H_4F_4— \qquad (2)$$

with accompanying hydrated iron fluoride. Subjecting the above polymer to temperatures in excess of 200° C., for example, produced no change in its properties.

This polymer was prepared in the following manner. In a stainless steel pressure bomb, were placed 21.4 grams of iron-pentacarbonyl and 12.95 grams of ethylcyclohexane, maintaining a nitrogen atmosphere. The bomb was then chilled to —100° C. and pumped out.

Ten grams of tetrafluoroethylene, $C_2F_4$, were then condensed into the bomb and the bomb was sealed. The bomb and its contents were then heated to 150° C. for 12 hours. After allowing the bomb to cool to room temperature, the residual gas was drawn off and the bomb was opened. The product consisted of a liquid and an insoluble brown solid. The brown solid was insoluble in ethylcyclohexane, petroleum ether, methylethylketone, and methylenechloride.

Analysis of the brown polymer showed that it contained 42.0% iron, 28.1% fluorine, 11.7% carbon, and 1.5% hydrogen. This corresponds to an empirical composition given by the formula $Fe_3C_4O_4F_6H_6$, containing an unavoidable excess of iron resulting from the thermal decomposition of the iron-pentacarbonyl. The hydrogen in the substance is believed to have been derived from the dehydrogenation of ethylcyclohexane under the reaction conditions. The insolubility of the substance prevented a determination of molecular weight. Heating the product with strong acids resulted in loss of fluorine in the form of hydrogen fluoride; in the absence of such acid, the product could be heated to more than 200° C., as before stated, without change of weight and without alteration of its appearance or composition.

In accordance with a further feature of the invention, the above-described method is preferred for preparing such novel polymers. This method may more generically be represented as in the drawing, wherein a fluorocarbon compound 1 is reacted under pressure at 2 with an excess of a transition-metal reactive compound 3 to induce the production of polyvalent fluorocarbon groups linked to more than one of the transition metal atoms, thus avoiding monomeric fluorocarbon linking with a single metal atom. After heating and cooling at 4 and 5, the resulting unreacted gases are then released at 6 and the resulting insoluble polymeric product is filtered out and washed at 7.

Example II

The sodium derivative of manganese carbonyl was prepared by the action of metallic sodium on dimanganese decacarbonyl, $Mn_2(CO)_{10}$. In tetrahydrofuran solution, 0.1 mole of $NaMn(CO)_5$ was combined with 0.1 mole of perfluorosuccinyl chloride, $ClCOCF_2CF_2COCl$. Sodium chloride precipitated out, and a yellow-brown polymer was recovered from the solvent. On heating to 100°, carbon monoxide was lost by decarboxylation of the succinic acid residue, leaving a polymer containing the repeating unit $-CF_2CF_2Mn(CO)_5-$.

Example III

Sodium cyclopentadienide was prepared by the reaction of a dispersion of metallic sodium upon freshly distilled cyclopentadiene. This reagent was decanted through a filter to separate it from the excess sodium and then was added to 0.03 mole of cobalt carbonyl to form cyclopentadienyl cobalt carbonyl, $C_5H_5Co(CO)_2$. Without separating the cyclopentadienyl cobalt carbonyl, the resulting solution was transferred to a stainless steel pressure vessel and tetrafluoroethylene, $C_2F_4$, was added under pressure while the bomb was heated to 70° to 140°. After cooling, the resulting liquid was withdrawn from the bomb and subjected to vacuum distillation. The resulting combination of the heterocyclic compound and linear polymeric compound $C_5H_5Co(C_4F_8)CO$, was recovered and purified by sublimation, to separate the monomeric heterocyclic product from the desired linear polymeric product, yielding pale yellow crystals melting at 106°. The separated residue from the crystallization consisted of a polymeric substance of substantially the same composition; cobalt atoms bearing one cyclopentadienyl group and one carbonyl group each were linked together by chains of four $CF_2$ groups; the polymer was dark in color and stable at 200° C.

Example IV

The iron carbonyl of composition $Fe_3(CO)_{12}$ was treated with sodium amalgan in the presence of tetrahydrofuran as solvent in order to prepare disodium iron tetracarbonyl, $Na_2Fe(CO)_4$. An excess of this reagent in tetrahydrofuran solution was then added to 0.05 mole of perfluoroadipic acid, in the form of its acid chloride $ClCOCF_2CF_2CF_2CF_2COCl$ in tetrahydrofuran solution. The mixture was then stirred at the reflux temperature. Carbon monoxide was evolved by decarbonylation, and sodium chloride precipitated. The resulting solution was filtered, and yielded a polymer of the repeating composition $-Fe(CO)_4-C_4F_8-$. This polymer was brown in color, insoluble in hydrocarbon solvents, and stable at 200° C.

Further modifications will occur to those skilled in the art, and all such are considered to fall within the spirit and scope of the invention as defined in the appended claim.

What is claimed is:

A new high polymer stable and solid at 200° C., insoluble in hydrocarbon solvents, and having substantially the following repeating unit

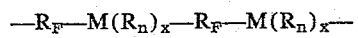

where $R_F$ is a perfluorocarbon, where M is a transition metal selected from the group consisting of scandium, titanium, vanadium, chromium, manganese, iron, cobalt, nickel, copper, zinc, yttrium, zirconium, columbium, molybdenum, technetium, ruthenium, rhodium, palladium, silver, cadmium, lanthanum, hafnium, tantalum, tungsten, rhenium, osmium, iridium, platinum, gold, mercury, and actinium, plus the rare earth and uranium or actinide metals, where $R_n$ is a carbonyl, and $x$ is an integer equal to or greater than one.

References Cited by the Examiner

Hoehn et al.: Journal of the Chemical Society, pp. 2738–2745 London (1961).

McBride et al.: Journal of the American Chemical Society, vol. 84, p. 497–9 (1962).

Beg et al.: Chemistry and Industry, p. 140 (1962).

JOSEPH L. SCHOFER, *Primary Examiner.*

WILLIAM H. SHORT, J. F. McNALLY, J. A. DONAHUE, *Assistant Examiners.*